United States Patent [19]

Leucht

[11] Patent Number: 5,823,310
[45] Date of Patent: Oct. 20, 1998

[54] APPARATUS FOR COUPLING A LOOSE WHEEL TO A SHAFT IN A CHANGE SPEED TRANSMISSION AND METHOD OF MAKING SAME

[75] Inventor: Hans Leucht, Esslingen, Germany

[73] Assignee: Mercedes-Benz AG, Stuttgart, Germany

[21] Appl. No.: 762,075

[22] Filed: Dec. 9, 1996

[30] Foreign Application Priority Data

Dec. 11, 1995 [DE] Germany ................ 195 46 087.1

[51] Int. Cl.⁶ .................... F16D 23/06; F16H 63/30
[52] U.S. Cl. .................... 192/53.34; 74/339
[58] Field of Search ............ 74/339, 432; 192/53.34, 192/53.341, 53.342, 53.343

[56] References Cited

U.S. PATENT DOCUMENTS

| | | | |
|---|---|---|---|
| 1,109,900 | 9/1914 | Coleman | 74/432 |
| 1,143,558 | 6/1915 | Templeton | 74/432 |
| 3,552,531 | 1/1971 | Grosseau | 74/339 X |
| 4,712,662 | 12/1987 | Elverdam . | |
| 4,750,597 | 6/1988 | Ikemoto et al. | 192/53.34 |
| 4,964,505 | 10/1990 | Lutz et al. | 192/53.341 |
| 5,267,636 | 12/1993 | Fielding | 192/53.34 |
| 5,547,057 | 8/1996 | Sperber | 192/53.34 |
| 5,641,045 | 6/1997 | Ogawa et al. | 192/53.341 |

OTHER PUBLICATIONS

Johannes Looman, "Gearboxes", Nov. 3, 1988, pp. 144, 393–398.

Primary Examiner—Charles A. Marmor
Assistant Examiner—Troy Grabow
Attorney, Agent, or Firm—Evenson, McKeown, Edwards & Lenahan, P.L.L.C.

[57] ABSTRACT

An apparatus for coupling a loose wheel to its shaft in a change speed transmission. A shift slide sleeve, which is non-rotatable with respect to the shaft, can be engaged by means of an internal clutch toothing in a corresponding external clutch toothing of a clutch ring which, by means of an internal driving toothing, engages in the running toothing of the loose wheel.

15 Claims, 1 Drawing Sheet

APPARATUS FOR COUPLING A LOOSE WHEEL TO A SHAFT IN A CHANGE SPEED TRANSMISSION AND METHOD OF MAKING SAME

BACKGROUND OF THE INVENTION

This invention relates to an apparatus for coupling a loose wheel to a shaft in a change speed transmission, and more particularly to a coupling apparatus having a shaft, a shift sleeve support, a shift slide sleeve having an inner axial clutch toothing, and a clutch ring having an outer clutch toothing and an inner driving toothing connected with an outer toothing of a loose wheel. The invention also relates to a method of making the coupling apparatus.

In the case of a coupling apparatus of the type generally described above known from Looman, "Gearboxes", 2nd Edition 1988, Springer Publishers Berlin Heidelberg New York London Paris Tokyo Page 144 Illustration 6.22), the inner driving toothing of the clutch ring engages in a corresponding outer driving toothing of the loose wheel of the gear step for the third gear. The outer driving toothing is constructed separately from, and axially next to, the running toothing of the loose wheel on a front-side hub projection of the wheel hub of the loose wheel, with the diameter of the hub projection being reduced with respect to the running toothing. In the case of this known shifting arrangement, a grooved recess must be provided between the running toothing and the outer driving toothing of the loose wheel in order to permit the gear tooth forming tool to be run-out to properly form the outer driving toothing during the manufacturing of the outer driving toothing.

Accordingly, there is a need for an apparatus for coupling a loose wheel to a shaft in a change speed transmission of the type generally described above which can be manufactured simply and at a relatively low cost and which is short in length.

SUMMARY OF THE INVENTION

These and other needs have been met according to the present invention by providing an apparatus for coupling a loose wheel to a shaft in a change speed transmission, comprising: a loose wheel rotatably disposed on a shaft and having a running toothing on an outer circumference, the running toothing including a reduced-diameter section, a base portion of the running toothing being continuous along an entire width of the loose wheel; a shift sleeve support fixed to the shaft adjacent the reduced-diameter section of the loose wheel; a shift slide sleeve arranged concentrically, non-rotatably, and axially displaceably with respect to the shift sleeve support, the shift slide sleeve having an inner clutch toothing; and a clutch ring arranged concentrically with respect to the loose wheel, the clutch ring having an outer clutch toothing selectively engageable by the inner clutch toothing of the shift slide sleeve, and the clutch ring having an inner driving toothing engaged with the reduced-diameter section of the running toothing of the loose wheel.

According to a further aspect of the present invention, these and other needs have been met by providing a method of making an apparatus for coupling a loose wheel to a shaft in a change speed transmission, comprising the steps of: arranging a loose wheel rotatably on a shaft, the loose wheel having a running toothing on an outer circumference, the running toothing including a full-diameter section and a reduced-diameter section, a base portion of the running toothing being continuous along an entire width of the loose wheel; fixing a shift sleeve support to the shaft adjacent the reduced-diameter section of the loose wheel; arranging a shift slide sleeve concentrically, non-rotatably, and axially displaceably with respect to the shift sleeve support, the shift slide sleeve having an inner clutch toothing; and arranging a clutch ring concentrically with respect to the loose wheel, the clutch ring having an outer clutch toothing selectively engageable by the inner clutch toothing of the shift slide sleeve, and the clutch ring having an inner driving toothing engaged with the reduced-diameter section of the running toothing of the loose wheel.

In accordance with the present invention, the loose wheel need not be provided with a separate driving toothing for its non-rotatable connection with the clutch ring so that, in addition to lower manufacturing costs, the length is also reduced because the groove for the run-out of the tooth forming tool is also eliminated.

In addition, the projection of the running toothing advantageously forms a radial shoulder which secures the clutch ring in the direction of the axis of rotation pointing from the shift sleeve support to the loose wheel.

According to a further aspect of the present invention, the clutch ring is secured in the opposite direction of the axis of rotation by an axial bearing surface of the shift sleeve support.

According to a further aspect of the present invention, the clutch ring is prevented from coming into frictional contact with the shift sleeve support when the synchronizing mechanism exercises a drag moment on the clutch ring in a disengaged position of the clutch toothings.

Other objects, advantages and novel features of the present invention will become apparent from the following detailed description of the invention when considered in conjunction with the accompanying drawings.

DETAILED DESCRIPTION OF THE DRAWINGS

Figure 1:
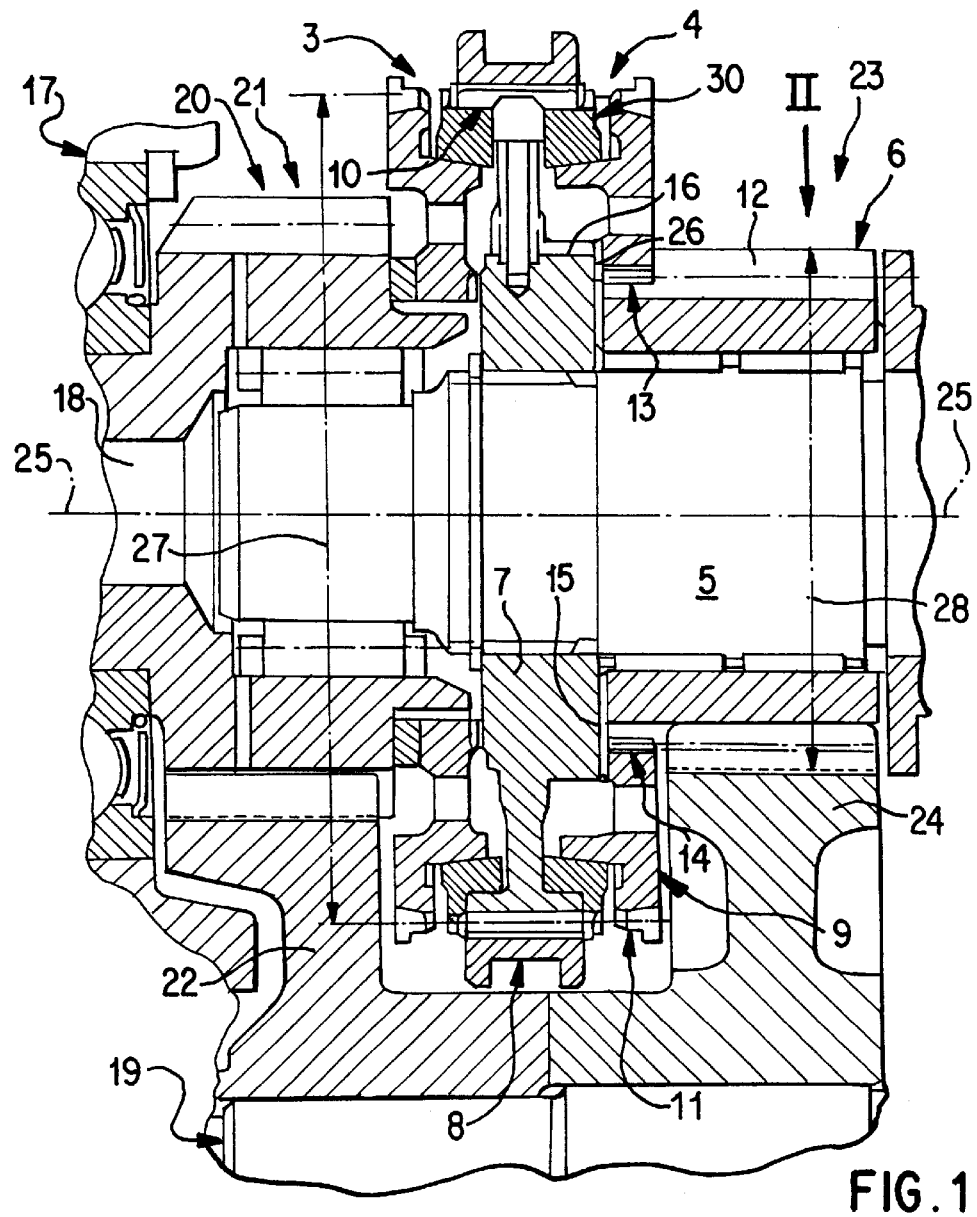
FIG. 1 is a partially sectional longitudinal view of a coupling apparatus according to a preferred embodiment of the present invention.

Referring to FIG. 1, an input shaft 18, an output shaft 5 arranged coaxially with the input shaft, and a countershaft 19 arranged parallel to the input and output shafts, are each rotatably and axially non-displaceably disposed in a transmission case 17 of a change speed transmission. The input shaft 18 and the countershaft 19 are in a constant driving connection by way of a transmission gearset 20. The transmission gearset 20 includes a main shaft gear 21 constructed in one piece with the input shaft 18 and a countershaft gear 22 which meshes with the main shaft gear 21 and which is arranged concentrically and stationarily (i.e., fixed) with respect to the countershaft 19. The output shaft 5 and the countershaft 19 can be brought into a driving connection by way of a gear step 23 for an upper forward gear. The gear step 23 includes a loose wheel 6 arranged rotatably and axially non-displaceably as well as concentrically with respect to the output shaft 5 and a countershaft gear 24 which is arranged concentrically and stationarily with respect to the countershaft 19 and meshes with the loose wheel 6.

A shifting arrangement 3 is used to optionally couple either the loose wheel 6 or the main shaft gear 21 with the output shaft 5, in order to selectively shift the upper and the direct forward gear. The shifting arrangement 3 includes a change shifting clutch 4 which contains a ringshaped shift sleeve support 7 arranged concentrically and stationarily with respect to the shaft 5 axially between the loose wheel 6 and the main shaft gear 21, and a shift slide sleeve 8 which is arranged concentrically, non-rotatably and axially displaceably with respect to the shift sleeve support 7. The shift slide sleeve 8 has an inner axial clutch toothing 10 on its inner circumference. The clutch ring 9 has an outer axial clutch toothing 11 on its outer circumference which corresponds to the inner axial clutch toothing 10.

Figure 2:
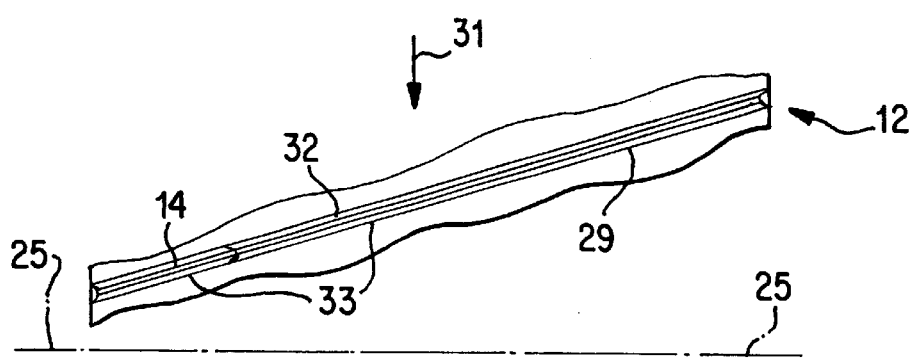
FIG. 2 is a partial view of the loose wheel of the coupling apparatus of FIG. 1 in the direction of the arrow II.

In order to shift into the upper forward gear, the shift slide sleeve 8 is selectively moved in a known manner, for example by a shifting fork, in a rearward direction (toward the right side in FIG. 1), where the inner axial clutch toothing 10 engages the outer axial clutch toothing 11 of the clutch ring 9, which is non-rotatably connected with the loose wheel 6. A running toothing 12 on the outer circumference of the loose wheel 6 is in meshing engagement with the countershaft gear 24. The running toothing 12 includes a full-diameter section 32 as well as a reduced-diameter section 14 at the front end 15 of the running toothing 12 adjacent the shift sleeve support 7. The base portion 33 of the running toothing 12 including both the reduced-diameter section 14 and the full-diameter section 32 is continuous along the entire width of the loose wheel 6, as shown in FIG. 2. In other words, the bases of the teeth in the reduced-diameter section 14 are integrally formed with the bases of the teeth in the full-diameter section 32. A corresponding inner axial driving toothing 13 on the inner circumference of the clutch ring 9 engages the reduced-diameter section 14 so that the clutch ring is non-rotatable with respect to the loose wheel 6. A radial shoulder formed by the reduced-diameter section 14 on the running toothing 12 secures the clutch ring 9 in the direction of the axis of rotation 25—25 of the shifting clutch 4 pointing from the shift sleeve support 7 to the loose wheel 6. In the opposite direction, the axial position of the clutch ring 9 is fixed by a front-side axial bearing surface 16 on the hub 26 of the shift sleeve support 7, the surface 16 radially overlapping with the running toothing 12.

The diameter 27 of the exterior clutch toothing 11 is designed to be larger than the outside diameter of the running toothing 12 to permit the connection between the loose wheel 6 and the clutch ring 9.

Since at least the base portion 33 of the reduced-diameter section 14 is continuous with the base portion of the full-diameter section 32, the reduced-diameter section 14 can advantageously be formed in the loose wheel 6 at the same time that the running toothing 12 is formed. For example, the loose wheel 6 with the running toothing 12 having the reduced-diameter section 14 may be manufactured in the following manner. A gear wheel blank having at least the diameter of the full-diameter section 32 of the running toothing 12 is formed. Then, the gear wheel blank is machined to form a smaller diameter section corresponding to the outer diameter of the reduced-diameter section 14. Finally, teeth are formed in the gear wheel blank by running a tooth-cutting tool along the full axial width of the gear wheel blank, creating the running toothing 12 and the reduced-diameter section 14 in the same pass. Alternatively, full diameter teeth running the full axial length of the gear wheel blank may be formed first, with these teeth subsequently being machined to form the reduced-diameter section 14. In a further alternative embodiment, a gear wheel blank already having a reduced diameter section may be used. In this way, the running toothing 12 including both the full-diameter section 32 and the reduced-diameter section 14 can be easily formed in the loose wheel 6 without separate cutting operations, and without a grooved recess between the full-diameter toothing and the reduced-diameter toothing, allowing the loose wheel to advantageously be smaller in axial length.

The running toothing 12 may be formed as helical toothing, as shown in FIG. 2. In such helical toothing, the tip 29 of the tooth of the running toothing 12 is oblique relative to the wheel axis of the loose wheel 6 coinciding with the axis of rotation 25—25. In this case the vertex of the helix angle with respect to the rotating direction 31 of the loose wheel 6 relative to the shift sleeve support 7 is positioned such that the clutch ring 9 is pushed in the axial direction pointing to the loose wheel 6 away from the shift sleeve support 7 in the case of idling drag moments in the synchronizing mechanism 30 arranged between the shift slide sleeve 8 and the clutch ring 9. When the input shaft 18 rotates, the loose wheel 6 will always rotate faster than the shift sleeve support 7 when the clutch toothings 10 and 11 as well as the synchronizing mechanism 30 are disengaged. In this way, the clutch ring 9 is prevented from coming into frictional contact with the shift sleeve support 7 when the synchronizing mechanism 30 exercises a drag moment on the clutch ring in a disengaged position of the clutch toothings 10,11.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An apparatus in a change speed transmission, comprising:
   a loose wheel rotatably disposed on a shaft and having a running toothing on an outer circumference, said running toothing including a reduced-diameter section, a base portion of said running toothing being continuous along an entire width of the loose wheel;
   a shift sleeve support fixed to said shaft adjacent said reduced-diameter section of said loose wheel;
   a shift slide sleeve arranged concentrically, non-rotatably, and axially displaceably with respect to said shift sleeve support, said shift slide sleeve having an inner clutch toothing; and
   a clutch ring arranged concentrically with respect to said loose wheel, said clutch ring having an outer clutch toothing selectively engageable by said inner clutch toothing of said shift slide sleeve, and said clutch ring having an inner driving toothing engaged with said reduced-diameter section of said running toothing of said loose wheel.

2. An apparatus according to claim 1, wherein the outer clutch toothing of the clutch ring has a larger diameter than the running toothing of the loose wheel.

3. An apparatus according to claim 1, wherein the shift sleeve support has an axial bearing surface on a side facing the loose wheel which radially overlaps with the running toothing.

4. An apparatus according to claim 2, wherein the shift sleeve support has an axial bearing surface on a side facing the loose wheel which radially overlaps with the running toothing.

5. An apparatus according to claim 3, wherein said clutch ring is axially secured between said axial bearing surface and a radial shoulder formed by a portion of said full-diameter section which extends radially beyond said reduced-diameter section.

6. An apparatus in a chance speed transmission, comprising:
- a loose wheel rotatable disposed on a shaft and having a running toothing on an outer circumference, said running toothing including a reduced-diameter section, a base portion of said running toothing being continuous along an entire width of the loose wheel;
- a shift sleeve support fixed to said shaft adjacent said reduced-diameter section of said loose wheel;
- a shift slide sleeve arranged concentrically, non-rotatably, and axially displaceably with respect to said shift sleeve support, said shift slide sleeve having an inner clutch toothing; and
- a clutch ring arranged concentrically with respect to said loose wheel, said clutch ring having an outer clutch toothing selectively engageable by said inner clutch toothing of said shift slide sleeve, and said clutch ring having an inner driving toothing engaged with said reduced-diameter section of said running toothing of said loose wheel, wherein said running toothing comprises a helical toothing, such that forces acting upon the inner driving toothing in the axial direction are directed in a direction pointing from the shift sleeve support to the loose wheel.

7. An apparatus according to claim 6, wherein the outer clutch toothing of the clutch ring has a larger diameter than the running toothing of the loose wheel.

8. An apparatus according to claim 6, wherein the shift sleeve support has an axial bearing surface on a side facing the loose wheel which radially overlaps with the running toothing.

9. An apparatus according to claim 7, wherein the shift sleeve support has an axial bearing surface on a side facing the loose wheel which radially overlaps with the running toothing.

10. An apparatus according to claim 8, wherein said clutch ring is axially secured between said axial bearing surface and a radial shoulder formed by a portion of said full-diameter section which extends radially beyond said reduced-diameter section.

11. A method of making an apparatus in a change speed transmission, comprising the steps of:
- arranging a loose wheel rotatably on a shaft, said loose wheel having a running toothing on an outer circumference, said running toothing including a full-diameter section and a reduced-diameter section, a base portion of said running toothing being continuous along an entire width of the loose wheel;
- fixing a shift sleeve support to said shaft adjacent said reduced-diameter section of said loose wheel;
- arranging a shift slide sleeve concentrically, non-rotatably, and axially displaceably with respect to said shift sleeve support, said shift slide sleeve having an inner clutch toothing; and
- arranging a clutch ring concentrically with respect to said loose wheel, said clutch ring having an outer clutch toothing selectively engageable by said inner clutch toothing of said shift slide sleeve, and said clutch ring having an inner driving toothing engaged with said reduced-diameter section of said running toothing of said loose wheel.

12. A method according to claim 11, further comprising, prior to said step of arranging the loose wheel rotatably on the shaft, forming the loose gear wheel by the steps of:
- forming a gear wheel blank having a diameter corresponding to said full-diameter section;
- forming a smaller diameter section in said gear wheel blank corresponding to said reduced-diameter section;
- forming teeth in said gear wheel blank along a full width of the gear wheel blank.

13. A method according to claim 11, wherein said running toothing comprises a helical toothing, such that forces acting upon the inner driving toothing in the axial direction are directed in a direction pointing from the shift sleeve support to the loose wheel.

14. A method according to claim 11, wherein the shift sleeve support has an axial bearing surface on a side facing the loose wheel which radially overlaps with the running toothing.

15. A method according to claim 14, wherein said clutch ring is axially secured between said axial bearing surface and a radial shoulder formed by a portion of said full-diameter section which extends radially beyond said reduced-diameter section.

* * * * *